United States Patent [19]
Carter

[11] Patent Number: 6,032,959
[45] Date of Patent: Mar. 7, 2000

[54] SHINGLE DAMPER BRUSH SEAL

[75] Inventor: Bruce A. Carter, West Chester, Ohio

[73] Assignee: General Electric Company, Cincinnati, Ohio

[21] Appl. No.: 08/897,590

[22] Filed: Jul. 21, 1997

[51] Int. Cl.[7] .................................................. F16J 15/447
[52] U.S. Cl. ...................... 277/355; 415/174.2; 415/231
[58] Field of Search .................................. 277/355, 345, 277/346, 352, 353; 415/173.3, 173.5, 174.2, 174.5, 230, 231

[56] References Cited

U.S. PATENT DOCUMENTS

| | | | |
|---|---|---|---|
| 4,358,120 | 11/1982 | Moore | 277/355 |
| 4,433,848 | 2/1984 | Williams . | |
| 4,448,425 | 5/1984 | Von Bergen . | |
| 4,961,588 | 10/1990 | Brienza . | |
| 5,026,252 | 6/1991 | Hoffelner | 415/174.2 |
| 5,071,138 | 12/1991 | Mackay et al. | 277/355 |
| 5,076,590 | 12/1991 | Steinetz et al. | 277/355 |
| 5,108,116 | 4/1992 | Johnson et al. | 277/355 |
| 5,114,159 | 5/1992 | Baird et al. . | |
| 5,174,582 | 12/1992 | Ferguson . | |
| 5,316,318 | 5/1994 | Veau | 277/355 |
| 5,318,309 | 6/1994 | Tseng et al. | 277/355 |
| 5,335,920 | 8/1994 | Tseng et al. . | |
| 5,400,952 | 3/1995 | Hetico et al. . | |
| 5,401,036 | 3/1995 | Basu | 277/355 |
| 5,480,160 | 1/1996 | Harms | 277/355 |
| 5,568,931 | 10/1996 | Tseng et al. . | |

*Primary Examiner*—Peter M. Cuomo
*Assistant Examiner*—Hanh V. Tran
*Attorney, Agent, or Firm*—Andrew C. Hess; Nathan D. Herkamp

[57] ABSTRACT

A brush seal includes a back plate against which an annular pack of bristles is disposed. A plurality of circumferentially overlapping shingle dampers engage in abutting contact the bristle pack for providing damping.

20 Claims, 2 Drawing Sheets

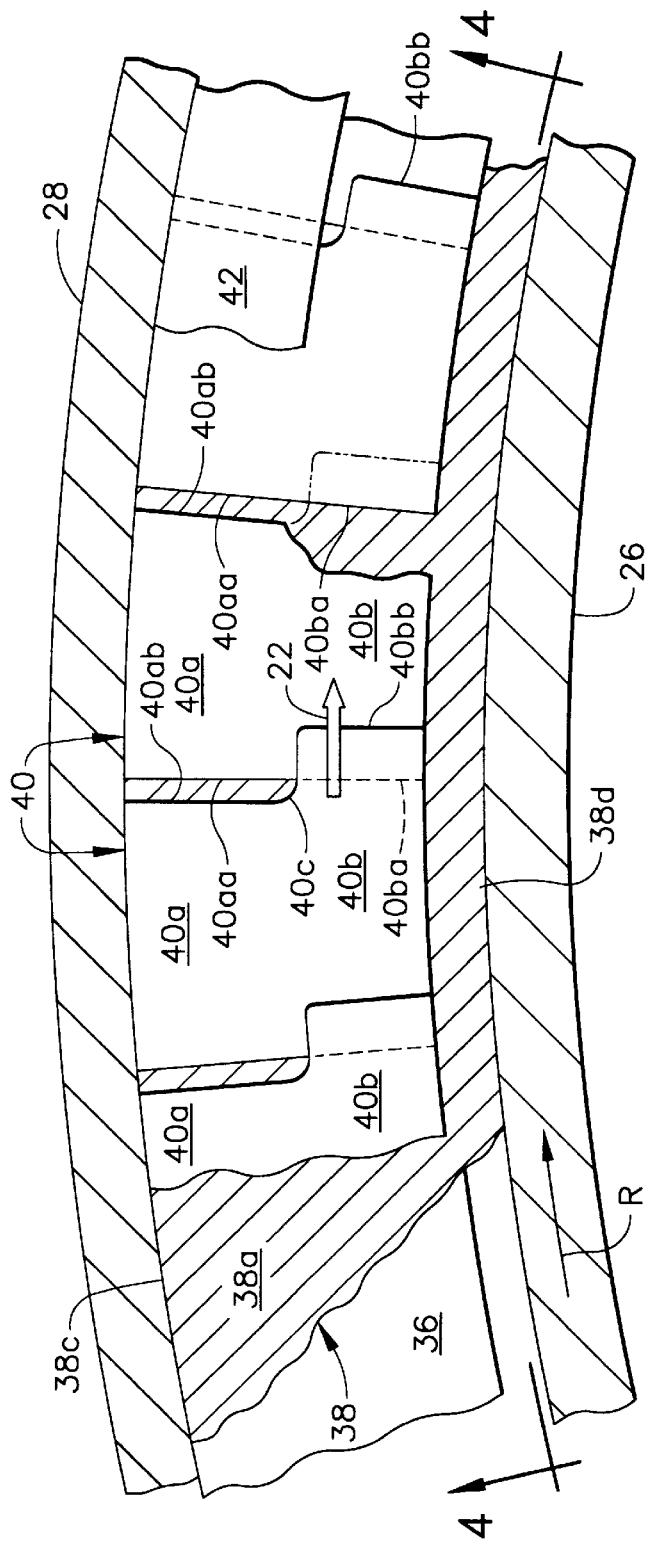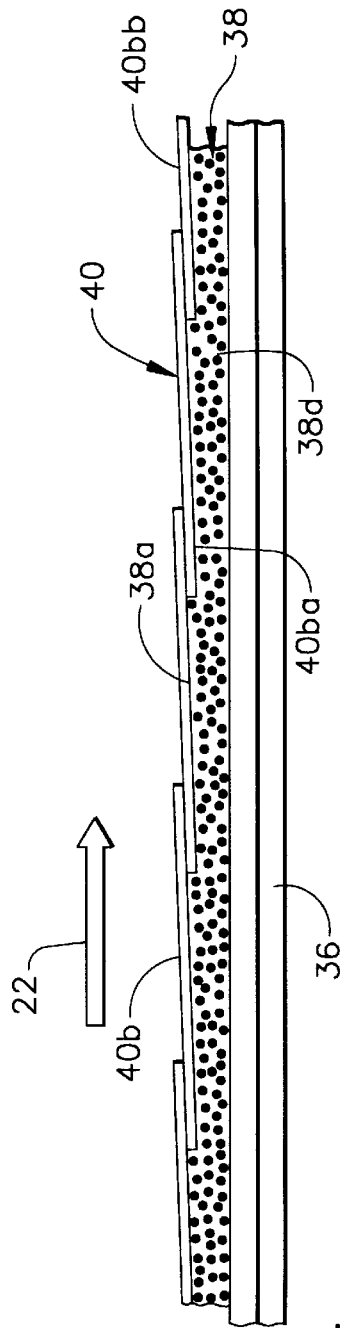

SHINGLE DAMPER BRUSH SEAL

BACKGROUND OF THE INVENTION

The present invention relates generally to gas turbine engines, and, more specifically, to brush seals therein.

In a gas turbine engine, air is compressed in a compressor, mixed with fuel in a combustor and ignited for generating hot combustion gases which flow downstream to one or more turbine stages which extract energy therefrom. Both the compressor and the turbine stages include stationary vanes cooperating with rotating blades for compressing and expanding in turn the compressed air and combustion gases, respectively. The compressed air and combustion gases vary in pressure through the engine and various seals are provided for maintaining differential pressure between the various components of the engine for maximizing performance efficiency thereof.

For example, a turbine rotor is typically sealed relative to a cooperating stator so that the rotor may be pressurized in the forward direction of the engine for providing thrust balancing in opposition to the aft directed force generated in a low pressure turbine. An annulus between the rotor and stator may include a brush seal in one or more stages for providing effective sealing therebetween.

A typical brush seal includes a pack of wire bristles inclined relative to the rotation of the rotor, with distal ends of the bristles contacting the rotor for maintaining a seal therewith. The bristle pack is supported between forward and back plates for providing structural integrity of the bristles which are relatively flexible for accommodating differential thermal movement between the stator and the rotor during operation. The bristles are subject to vibration due to movement of the pressurized fluid being sealed thereby. For example, the rotor induces a circumferential component of velocity of the pressurized fluid which engages the bristles causing excitation thereof.

In order to dampen vibration of the bristles during operation, an annular damper plate is typically provided to sandwich the bristle pack against the back plate leaving exposed only a small portion of the bristles at their distal ends for contacting the rotor. An exemplary damper plate includes an annulus of thin sheet metal having a plurality of circumferentially spaced apart radial slits extending outwardly from the inner diameter thereof to circumferentially segment the damper plate for accommodating differential thermal expansion and contraction. However, the individual tabs defined between the slits are themselves subject to flow induced flutter which may lead to high cycle fatigue damage of the damper plate itself, and in turn the bristles therebelow.

Accordingly, a brush seal having an improved damper is desired for increasing damping effectiveness and increasing useful life during operation.

SUMMARY OF THE INVENTION

A brush seal includes a back plate against which an annular pack of bristles is disposed. A plurality of circumferentially overlapping shingle dampers engage in abutting contact the bristle pack for providing damping.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 3 is a partly sectional radial view of one of the seal stages illustrated in FIG. 2 and taken generally along line 3—3.

FIG. 4 is a radially outwardly facing, circumferential view of the brush seal illustrated in FIG. 3 and taken generally along line 4—4.

DESCRIPTION OF THE PREFERRED EMBODIMENT(S)

Figure 1:
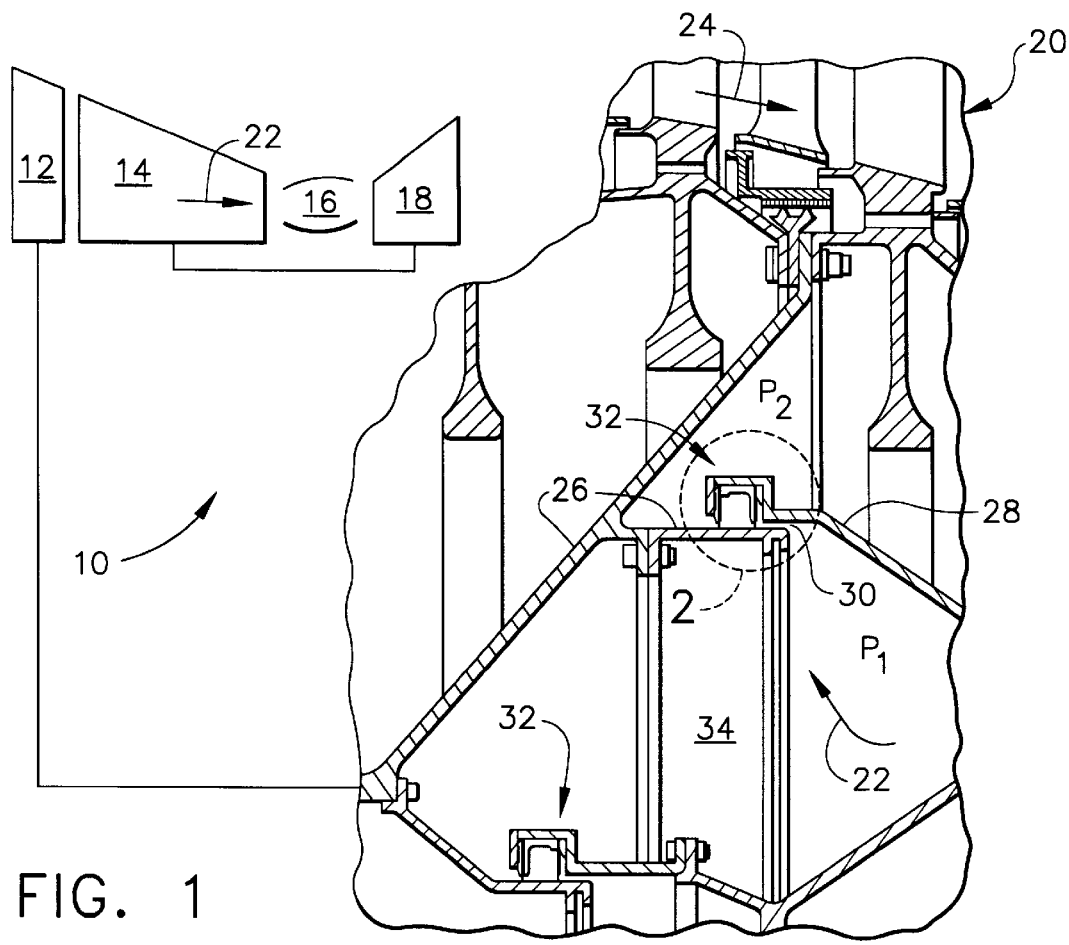
FIG. 1 is a partly sectional, axial view of a low pressure turbine of a gas turbine engine shown in relevant part having a pair of brush seals in accordance with an exemplary embodiment of the present invention.

Illustrated in part in FIG. 1 is an exemplary gas turbine engine 10 having in serial flow communication a fan 12, compressor 14, combustor 16, high pressure turbine 18, and low pressure turbine 20 disposed coaxially about a common longitudinal centerline axis. Air 22 is channeled through the fan and compressor and undergoes compression for providing pressurized air to the combustor 16 wherein it is mixed with fuel and ignited for generating hot combustion gases 24 which flow downstream through the high and low pressure turbines 18, 20 which extract energy therefrom for powering the fan 12 and compressor 14 during operation.

The engine 10 itself is conventionally configured and operated and requires various seals between the rotating and stationary components thereof. For example, in FIG. 1, an annular rotor 26 of the low pressure turbine 20 includes a cylindrical portion which is spaced radially inwardly from a cooperating cylindrical portion of a stationary stator 28 of a conventional turbine rear frame to define an annulus 30 therebetween.

In accordance with the present invention, a brush seal 32 is mounted to the stator 28 radially outwardly of the rotor 26 for sealing the annulus 30. In the exemplary embodiment illustrated in FIG. 1, a second brush seal 32 is mounted radially below the first brush seal between corresponding portions of the rotor 26 and stator 28 to define an enclosed plenum 34 in which a portion of the compressed air 22 is suitably channeled for pressurizing the plenum 34 to a first pressure $P_1$ greater than the outside, second pressure $P_2$ to provide thrust balancing of the rotor 26 in a conventional manner. The brush seals 32 ensure effecting sealing of the plenum 34 in accordance with the present invention with enhanced damping effectiveness and a resulting increase in useful life of the seals 32.

Figure 2:
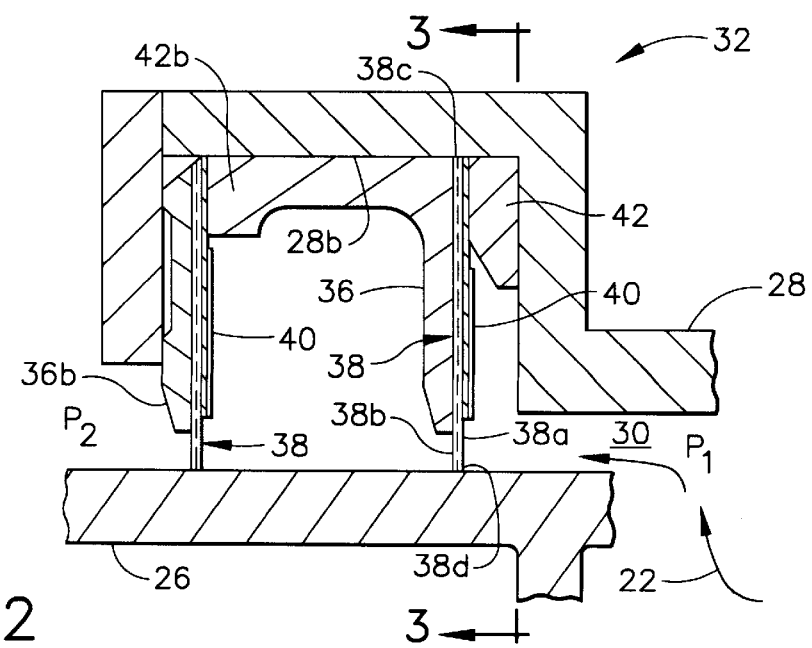
FIG. 2 is an enlarged, axial sectional view of one of the brush seals illustrated in FIG. 1 within the circle labeled 2.

An exemplary embodiment of the brush seal 32 is illustrated in more particularity in FIG. 2 and is mounted in a cooperating U-shaped socket 28b of the stator 28 in a conventional manner. The brush seal 32 includes two generally identical forward and aft axial stages preferably cooperating in an integral, unitary ring member. The aft stage of the brush seal 32 includes an annular back plate 36 having a conventional configuration for being fixedly joined to the stator socket 28b. An annular row or pack 38 of wire bristles includes axially opposite front and back sides 38a,b, and radially opposite proximal and distal ends 38c,d. The bristle pack 38 may have any conventional form including several rows of individual bristles, with the pack proximal end 38c being suitably fixedly joined to the back plate 36 by welding at its outer diameter. The pack distal end 38d is its brush end extending radially inwardly and cantilevered from its proximal end for contacting the rotor 26 to define the brush seal therewith radially across the annulus 30.

In accordance with the present invention, the brush seal 32 further includes a plurality of circumferentially overlapping shingle dampers 40 engaged in abutting contact with the pack front side 38a, with the pack back side 38b being engaged in abutting contact with the back plate 36. But for the shingle dampers 40 in accordance with the present invention, the remainder of the brush seal 32 may be conventional in configuration and operation.

As shown in FIG. 3, each of the shingle dampers 40 is preferably a unitary or one-piece sheet metal plate which is suitably thin and flexible. Each damper 40 includes a radially outer proximal end 40a spaced circumferentially from an adjacent damper proximal end 40a on both circumferential sides. Each damper 40 also includes a radially inner distal end 40b circumferentially overlapping an adjacent damper distal end 40b to provide a circumferentially continuous, but segmented, overlapping ring which not only provides a fluid seal over the underlying bristles but also increases damping effectiveness between the adjacent shingle dampers 40 themselves.

Each of the damper distal ends 40b includes circumferentially opposite leading and trailing edges or portions 40ba and 40bb, with the trailing edge 40bb overlapping circumferentially a leading edge 40ba of an adjacent damper distal end 40b.

Each of the damper proximal ends 40a includes circumferentially opposite leading and trailing edges or portions 40aa and 40ab which are preferably disposed coplanar with the leading and trailing edges 40aa,ab of the circumferentially adjacent damper proximal ends 40a. An annular front plate 42 is fixedly joined to the bristle pack proximal end 38c on its front side, by welding for example, to cover in most part the damper proximal end 40a.

As shown in FIG. 2, the two seal stages are defined by their common bristle packs 38 and cooperating shingle dampers 40 which are sandwiched between the front and back plates 42,36. In the forward stage illustrated in FIG. 2, a discrete back plate 36b is used on one side, with a front plate 42b forming an integral portion of the back plate 36 of the aft stage. The back plate 36 of the aft stage and the front plate 42b of the forward stage are arranged in a common generally L-shaped member in conventional configuration which is sandwiched between the front plate 42 of the aft stage and the back plate 36b of the forward stage, with all the components of the two-stage brush seal 32 being suitably welded together at the radially outer ends thereof in a conventional manner. In this way, the two stage brush seal 32 may be in the form of a unitary ring which may be axially inserted into one end of the stator socket 28b during assembly and suitably axially retained therein.

Referring again to FIG. 3, each of the trailing edges 40ab,bb of the damper proximal and distal ends 40a,b are preferably joined together at a radius corner 40c spaced in most part radially below or away from the front plate 42. The radius of the corner 40c is selected for suitably reducing stress concentration thereat, and allows the damper proximal ends 40a to remain coplanar and clamped flatly against the common front plate 42 to maintain an accurate and tightly fitted seal joint therebetween.

The damper distal ends 40b may then suitably resiliently flex to overlap adjacent damper distal ends 40b in a generally bi-planar arrangement as illustrated in end view of FIG. 4. The overlapping damper distal ends 40b provide a barrier seal over the bristle pack 38 against infiltration by the pressurized air 22, while also mechanically coupling together the adjacent shingle dampers 40 to increase the circumferential stiffness and resonant frequency thereof, and provide enhanced frictional damping therebetween.

As shown in FIG. 3, the individual bristles of the bristle pack 38 are inclined radially relative to a rotation direction R of the rotor 26 to position the distal or contact ends thereof downstream of the proximal ends thereof which are located relatively upstream therefrom. Rotation of the rotor 26 will induce a circumferential component of velocity of the pressurized air 22 in a clockwise direction illustrated in FIG. 3. The predominant airflow direction is clockwise in FIG. 3 which causes the pressurized air 22 to flow circumferentially clockwise over the individual shingle dampers 40. The bristles are inclined radially inwardly in this downstream direction to match the rotation of the rotor 26 and provide bending of the bristles during differential thermal movement between the rotor 26 and stator 28 for maintaining effective sealing in a conventional manner.

In view of this predominant local airflow direction around the rotor 26 and over the shingle dampers 40, the leading edges 40ba of the damper distal ends 40b as illustrated in FIGS. 3 and 4 are preferably engaged in direct abutting contact with the bristle pack front side. And, the trailing edges 40bb of the damper distal ends 40b are engaged axially outwardly of respective adjacent ones of the leading edges 40ba to effect circumferential overlap therewith in an ordinary shingle arrangement. The leading edges 40ba of the damper distal ends 40b are preferably disposed upstream of the trailing edges 40bb thereof to prevent aerodynamic lifting.

As shown in FIG. 4, the pressurized air 22 flows to the right and flows off the respective trailing edges 40bb, with the leading edges 40ba being hidden and protected thereunder. The pressure of the compressed air 22 biases the trailing edges 40bb against the underlying leading edges 40ba for maintaining an effective aerodynamically clamped seal therewith.

As shown in FIG. 3, the leading edges 40aa,ba of the damper proximal and distal ends 40a,b are preferably colinearly aligned in the radial direction, and the shingle dampers 40 overlap solely at the trailing edges 40bb of the damper distal ends 40b. The trailing edges 40bb define a tab on the downstream ends of each damper 40, with the upstream end of each damper being straight and without an integral tab in the preferred embodiment illustrated.

As shown in FIGS. 2 and 3, each of the shingle dampers 40 is substantially radially coextensive with the back plate 36, with the damper distal ends 40b occupying in most part the available radial space between the distal end of the back plate 36 and the higher forward plate 42. The shingle dampers 40 therefore maximize their overlapping coverage over the front side 38a of the bristle pack 38 for providing effective sealing and damping thereof, as well as damping of the shingle dampers 40 themselves. The non-overlapping portions of the shingle dampers 40 are confined to the relatively small area under the front plate 42 wherein the damper proximal ends 40a are bound coplanar therebetween.

The shingle dampers 40 may be suitably varied in configuration as desired for cooperating in brush seals for enhancing sealing and damping effectiveness. They may be introduced in an otherwise conventional brush seal with no additional modifications thereof in view of their tailored design. The overlapping shingle dampers 40 are also self-sealing in operation due to differential pressure acting across the overlapping portions thereof. The effective stiffness of the circumferentially overlapping dampers correspondingly increases during operation which increases the resonant frequencies thereof and improves damping.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A brush seal for sealing an annulus between an annular rotor and stator, comprising:

a unitary annular back plate fixedly joinable to said stator;

an annular pack of bristles having front and back sides, and proximal and distal ends, said pack proximal end being fixedly joined to said back plate, and said pack distal end being cantilevered therefrom for contacting said rotor; and a plurality of discrete shingle dampers engaged in abutting contact with said pack front side and circumferentially overlapping each other only in radial inboard part atop said pack front side, with said pack back side being engaged in abutting contact with said back plate.

2. A seal according to claim 1 wherein each of said shingle dampers comprises:

a proximal end spaced circumferentially from an adjacent damper proximal end; and a distal end circumferentially overlapping an adjacent damper distal end.

3. A seal according to claim 2 wherein each of said damper distal ends comprises leading and trailing edges, with said trailing edge overlapping a leading edge of an adjacent damper distal end.

4. A seal according to claim 3 wherein each of said damper proximal ends comprises leading and trailing edges disposed coplanar with leading and trailing edges of adjacent damper proximal ends.

5. A seal according to claim 4 further comprising a front plate fixedly joined to said bristle pack proximal end to cover said damper proximal ends.

6. A seal according to claim 5 wherein said trailing edges of said damper proximal and distal ends are joined together at a radius corner spaced from said front plate.

7. A seal according to claim 6 in combination with said stator and rotor and wherein:

said brush seal is fixedly joined to said stator to position said distal end of said bristle pack in abutting contact with said rotor;

said bristles being inclined relative to a rotation direction of said rotor to position distal ends thereof downstream of proximal ends thereof;

said leading edges of said damper distal ends are engaged in abutting contact with said pack front side; and said trailing edges of said damper distal ends are engaged outwardly of respective ones of said leading edges thereof to effect said circumferential overlap therewith.

8. An apparatus according to claim 7 wherein said leading edges of said damper distal ends are disposed upstream of said trailing edges thereof.

9. An apparatus according to claim 8 wherein said leading edges of said damper proximal and distal ends are colinearly aligned, and said shingle dampers overlap solely at said trailing edges of said damper distal ends.

10. An apparatus according to claim 9 wherein said shingle dampers are substantially radially coextensive with said back plate.

11. A brush seal comprising an annular pack of bristles disposed between a unitary annular back plate on one side thereof and a plurality of discrete dampers on an opposite side thereof, with said dampers overlapping each other only in radial inboard part circumferentially around said pack in abutting contact therewith for frictional damping thereof.

12. A seal according to claim 11 wherein said dampers have radially opposite proximal and distal ends, with said proximal ends being circumferentially spaced apart from each other, and said distal ends circumferentially overlapping each other.

13. A seal according to claim 12 wherein said damper distal ends abut said bristles for frictional damping thereof.

14. A seal according to claim 13 wherein said damper proximal ends are coplanar, and said damper distal ends are bi-planar.

15. A seal according to claim 13 wherein each of said dampers comprises a unitary sheet metal plate.

16. A seal according to claim 13 wherein said damper distal ends circumferentially overlap each other in a series of identical shingles.

17. A seal according to claim 13 wherein said damper proximal and distal ends are co-radially aligned at one edge, and said dampers overlap solely at said distal ends.

18. A seal according to claim 17 wherein each of said damper distal ends includes a tab circumferentially overlapping an adjacent damper distal end.

19. A brush seal comprising an annular pack of bristles disposed between a back plate on one side thereof and a plurality of sheet metal dampers on an opposite side thereof, with said dampers having circumferentially spaced apart, coplanar proximal ends abutting said bristles, and distal ends overlapping each other circumferentially around said pack in abutting contact therewith for frictional damping thereof.

20. A seal according to claim 19 wherein said damper proximal and distal ends are integrally joined together at a radius corner.

* * * * *